(12) United States Patent
Peuhkurinen et al.

(10) Patent No.: US 10,602,132 B2
(45) Date of Patent: Mar. 24, 2020

(54) DISPLAY APPARATUS AND METHOD OF DISPLAYING USING LIGHT SOURCE AND CONTROLLABLE SCANNING MIRROR

(71) Applicant: Varjo Technologies Oy, Helsinki (FI)

(72) Inventors: Ari Antti Erik Peuhkurinen, Helsinki (FI); Oiva Arvo Oskari Sahlsten, Salo (FI); Klaus Mikael Melakari, Oulu (FI)

(73) Assignee: VARJO TECHNOLOGIES OY, Helsinki (FI)

( * ) Notice: Subject to any disclaimer, the term of this patent is extended or adjusted under 35 U.S.C. 154(b) by 139 days.

(21) Appl. No.: 15/913,361

(22) Filed: Mar. 6, 2018

(65) Prior Publication Data

US 2019/0281279 A1    Sep. 12, 2019

(51) Int. Cl.
| | |
|---|---|
| *H04N 13/383* | (2018.01) |
| *G02B 26/10* | (2006.01) |
| *H04N 13/32* | (2018.01) |
| *G02B 27/00* | (2006.01) |
| *H04N 19/167* | (2014.01) |

(Continued)

(52) U.S. Cl.
CPC ....... *H04N 13/383* (2018.05); *G02B 26/0833* (2013.01); *G02B 26/101* (2013.01); *G02B 26/127* (2013.01); *G02B 27/0093* (2013.01); *G02B 27/017* (2013.01); *H04N 9/3129* (2013.01); *H04N 9/3188* (2013.01); *H04N 9/3194* (2013.01); *H04N 13/32* (2018.05); *H04N 19/167* (2014.11); *G06F 3/013* (2013.01)

(58) Field of Classification Search
CPC ............... G02B 26/101; G02B 26/127; G02B 26/0833; G02B 27/0093; H04N 13/383; H04N 19/167; G06F 3/013
See application file for complete search history.

(56) References Cited

U.S. PATENT DOCUMENTS

| 4,513,317 A | 4/1985 | Ruoff, Jr. | |
|---|---|---|---|
| 9,986,215 B1 * | 5/2018 | Tardif | .............. H04N 9/3188 |

(Continued)

OTHER PUBLICATIONS

Notification of Transmittal of the International Search Report and the Written Opinion of the International Searching Authority, or the Declaration issued in PCT Application No. PCT/FI2019/050168 dated Sep. 5, 2019, 17 pages.

*Primary Examiner* — Robert J Hance
(74) *Attorney, Agent, or Firm* — Ziegler IP Law Group, LLC

(57) ABSTRACT

A display apparatus including at least one light source per eye; at least one controllable scanning mirror per eye; means for detecting gaze direction of user; and a processor communicably coupled to the aforementioned components. The processor is configured to (a) obtain an input image and determine region of visual accuracy thereof; (b) generate pixel data corresponding to at least a first region and a second region of the input image, wherein the second region substantially corresponds to the region of visual accuracy of the input image, while the first region substantially corresponds to a remaining region of the input image, wherein the first region have a first resolution, while the second region have a second resolution, the second resolution being higher than the first resolution; and (c) control the at least one light source and the at least one controllable scanning mirror to draw the aforementioned regions.

20 Claims, 7 Drawing Sheets

(51) Int. Cl.
  *H04N 9/31*    (2006.01)
  *G02B 27/01*   (2006.01)
  *G02B 26/12*   (2006.01)
  *G02B 26/08*   (2006.01)
  *G06F 3/01*    (2006.01)

(56) References Cited

U.S. PATENT DOCUMENTS

| | | | |
|---|---|---|---|
| 10,176,639 B2 * | 1/2019 | Schowengerdt | G02B 6/32 |
| 2008/0186501 A1 * | 8/2008 | Xie | A61B 5/0066 |
| | | | 356/450 |
| 2010/0149073 A1 | 6/2010 | Chaum et al. | |
| 2011/0075104 A1 * | 3/2011 | Sakakibara | A61B 3/10 |
| | | | 353/31 |
| 2012/0105310 A1 * | 5/2012 | Sverdrup | G02B 27/017 |
| | | | 345/8 |
| 2015/0173846 A1 * | 6/2015 | Schneider | A61B 1/00009 |
| | | | 600/424 |
| 2015/0178939 A1 * | 6/2015 | Bradski | G02B 27/017 |
| | | | 345/633 |
| 2016/0328884 A1 | 11/2016 | Schowengerdt et al. | |
| 2017/0188021 A1 * | 6/2017 | Lo | H04N 3/08 |
| 2017/0285343 A1 * | 10/2017 | Belenkii | G02B 27/0172 |
| 2018/0045960 A1 * | 2/2018 | Palacios | G02B 27/017 |
| 2018/0176551 A1 * | 6/2018 | Viswanathan | H04N 9/3161 |
| 2018/0255278 A1 * | 9/2018 | Tardif | H04N 9/3129 |

\* cited by examiner

DISPLAY APPARATUS AND METHOD OF DISPLAYING USING LIGHT SOURCE AND CONTROLLABLE SCANNING MIRROR

TECHNICAL FIELD

The present disclosure relates generally to representation of visual information; and more specifically, to display apparatuses comprising light sources, controllable scanning mirrors, means for detecting gaze direction of users and processors. Furthermore, the present disclosure also relates to methods of displaying via the aforementioned display apparatuses.

BACKGROUND

Nowadays, several technologies are being used to present interactive simulated environments to users of specialized devices. Such technologies include virtual reality, augmented reality, mixed reality, and the like. Presently, the users utilize the specialized devices (for example, such as virtual reality headsets, a pair of virtual reality glasses, augmented reality headsets, a pair of augmented reality glasses, mixed reality headsets, a pair of mixed reality glasses, and the like) for experiencing and interacting with such simulated environments. Specifically, the simulated environments enhance the user's experience of reality around him/her by providing the user with a feeling of immersion within the simulated environment, using contemporary techniques such as stereoscopy.

Generally, the specialized devices include displays or screens arranged therein, whereupon images constituting the simulated environments are rendered. Often, such devices have dedicated displays for each eye of the user, for providing different views of a given scene within the simulated environment to the user's eyes. Such different views allow the user to perceive stereoscopic depth within the given scene, thereby, creating the feeling of immersion within the simulated environment. Nowadays, some specialized devices also allow for implementing gaze-contingency therein, thereby, adjusting (namely, controlling) the simulated environment based upon a direction of the user's gaze.

However, conventional specialized devices have certain limitations associated therewith. Firstly, in some existing specialized devices, a position of the displays is fixed. In such a case, the specialized devices include a large number of optical components (such as lenses, mirrors, projectors, and the like) that are movable to implement gaze contingency. Often, an arrangement of such optical components within the specialized devices is complex, and therefore, movement of multiple optical components for implementing gaze-contingency is very cumbersome. Secondly, in some existing specialized devices, the displays are movable. Owing to considerable size of such displays, provision of space for their movement makes such specialized devices bulky.

Therefore, in light of the foregoing discussion, there exists a need to overcome the aforementioned drawbacks associated with conventional specialized devices for providing simulated environments.

SUMMARY

The present disclosure seeks to provide a display apparatus.

The present disclosure also seeks to provide a method of displaying, via a display apparatus comprising at least one light source per eye, at least one controllable scanning mirror per eye and means for detecting a gaze direction of a user.

The present disclosure seeks to provide a solution to the existing problem associated with a large number and size of moving parts for implementing gaze contingency within specialized devices. An aim of the present disclosure is to provide a solution that overcomes at least partially the problems encountered in prior art, and provides a compact and lightweight display apparatus that eliminates aforesaid inaccuracies in the existing specialized devices.

In one aspect, an embodiment of the present disclosure provides a display apparatus comprising:
- at least one light source per eye, the at least one light source being operable to emit a substantially collimated and monochromatic light beam;
- at least one controllable scanning mirror per eye, the at least one controllable scanning mirror being arranged to reflect the light beam towards a projection surface, wherein the at least one scanning mirror is to be controlled to change a direction in which the light beam is reflected;
- means for detecting a gaze direction of a user, wherein the gaze direction is to be detected when the display apparatus in operation is worn by the user; and
- a processor coupled in communication with the at least one light source, the at least one controllable scanning mirror and the means for detecting the gaze direction, wherein the processor is configured to:
  - (a) obtain an input image and determine, based upon the detected gaze direction of the user, a region of visual accuracy of the input image;
  - (b) generate pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region is to have a first resolution, while the second region is to have a second resolution, the second resolution being higher than the first resolution; and
  - (c) control the at least one light source and the at least one controllable scanning mirror to draw the first region and the second region of the input image over the projection surface.

In another aspect, an embodiment of the present disclosure provides a method of displaying, via a display apparatus comprising at least one light source per eye, at least one controllable scanning mirror per eye and means for detecting a gaze direction of a user, the method comprising:
- (a) obtaining an input image and determining, based upon the detected gaze direction of the user, a region of visual accuracy of the input image;
- (b) generating pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region has a first resolution, while the second region has a second resolution, the second resolution being higher than the first resolution; and
- (c) controlling the at least one light source and the at least one controllable scanning mirror to draw the first region and the second region of the input image over a projection surface, wherein the step of controlling comprises driving the at least one light source to emit a substantially collimated and monochromatic light beam and driving the at least one controllable scanning mirror to change a direction in which the light beam is reflected.

Embodiments of the present disclosure substantially eliminate or at least partially address the aforementioned problems in the prior art, and enables substantially simpler, convenient and near-real time implementation of gaze-contingency within the aforesaid display apparatus as compared to conventional display apparatuses.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
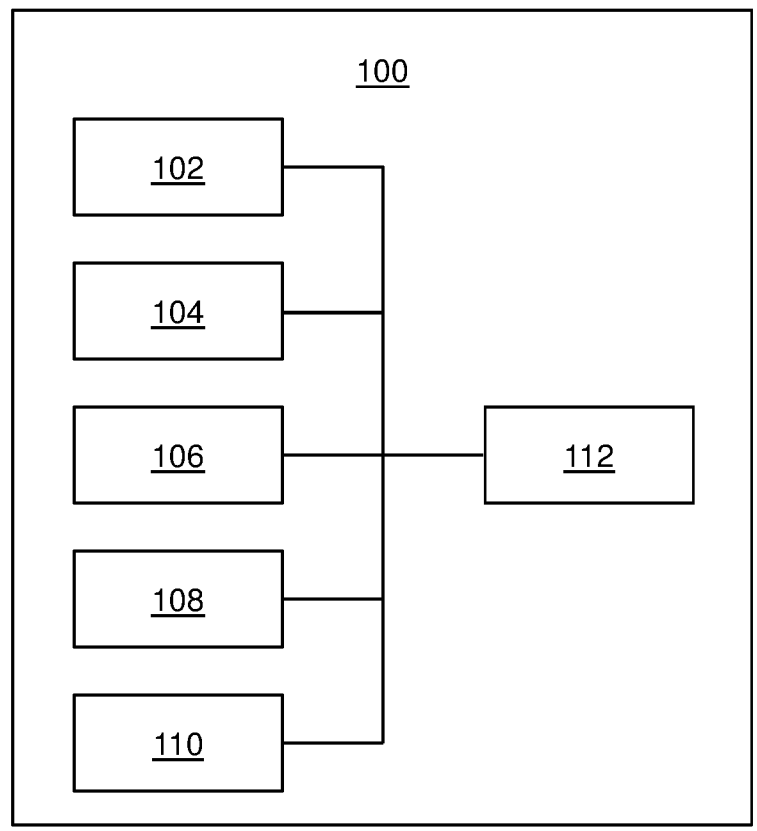
FIG. 1 illustrates a block diagram of architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  at least one light source per eye, the at least one light source being operable to emit a substantially collimated and monochromatic light beam;
  at least one controllable scanning mirror per eye, the at least one controllable scanning mirror being arranged to reflect the light beam towards a projection surface, wherein the at least one scanning mirror is to be controlled to change a direction in which the light beam is reflected;
  means for detecting a gaze direction of a user, wherein the gaze direction is to be detected when the display apparatus in operation is worn by the user; and
  a processor coupled in communication with the at least one light source, the at least one controllable scanning mirror and the means for detecting the gaze direction, wherein the processor is configured to:
    (a) obtain an input image and determine, based upon the detected gaze direction of the user, a region of visual accuracy of the input image;
    (b) generate pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region is to have a first resolution, while the second region is to have a second resolution, the second resolution being higher than the first resolution; and
    (c) control the at least one light source and the at least one controllable scanning mirror to draw the first region and the second region of the input image over the projection surface.

In another aspect, an embodiment of the present disclosure provides a method of displaying, via a display apparatus comprising at least one light source per eye, at least one controllable scanning mirror per eye and means for detecting a gaze direction of a user, the method comprising:
  (a) obtaining an input image and determining, based upon the detected gaze direction of the user, a region of visual accuracy of the input image;
  (b) generating pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region has a first resolution, while the second region has a second resolution, the second resolution being higher than the first resolution; and (c) controlling the at least one light source and the at least one controllable scanning mirror to draw the first region and the second region of the input image over a projection surface, wherein the step of controlling comprises driving the at least one light source to emit a substantially collimated and monochromatic light beam and driving the at least one controllable scanning mirror to change a direction in which the light beam is reflected.

The present disclosure provides the aforementioned display apparatus and the aforementioned method of displaying, via such a display apparatus. The display apparatus described herein is not limited in operation by number of components and arrangement of such components within the display apparatus. Notably, the described display apparatus includes few, small-sized moving components for implementing gaze contingency in real-time or near-real time. For example, merely adjusting an alignment of the at least one controllable scanning mirror allows for implementing gaze-contingency within the display apparatus. Therefore, implementation of gaze-contingency within the aforesaid display apparatus is substantially simpler and convenient as compared to conventional display apparatuses. Furthermore, the described display apparatus is operable to draw multiresolution images on the projection surface in a simple manner. For example, at least the first and second regions of the input image can be drawn on the projection surface by adjusting direction of the light beam that is incident upon the at least one controllable scanning mirror. Moreover, the aforesaid display apparatus is compact and lightweight. Beneficially, the described method is implemented in real-time or near-real time.

Throughout the present disclosure, the term "display apparatus" used herein relates to specialized equipment that is configured to display a visual scene of a simulated environment to the user of the display apparatus when the display apparatus is worn by the user on his/her head. In such an instance, the display apparatus is operable to act as a device (for example, such as a virtual reality headset, an augmented reality headset, a mixed reality headset, a pair of virtual reality glasses, a pair of augmented reality glasses, a pair of mixed reality glasses and so forth) for presenting the simulated environment to the user.

Throughout the present disclosure, the term "light source" used herein relates to equipment used to emit the substantially collimated and monochromatic light beam. Optionally, in such a case, the at least one light source comprises at least one collimating element (for example, such as a collimating lens) to adjust cross section of the light beam. Furthermore, optionally, the at least one light source comprises an optical filter configured to allow only light of a given wavelength or a given wavelength range to pass therethrough, and be consequently emitted from the at least one light source. Examples of the at least one light source include, but are not limited to, a laser diode, a solid state laser.

The display apparatus comprises the at least one light source per eye. In such a case, separate light sources for a left eye and a right eye of the user emit substantially collimated and monochromatic light beams towards the at least one controllable scanning mirror. In such a case, each light beam is associated with an optical path. As an example, the display apparatus may comprise two light sources per eye, wherein the four light sources emit four substantially collimated and monochromatic light beams having four different optical paths.

For sake of simplicity and clarity, the term "at least one light source" is hereinafter referred to as "a light source".

Throughout the present disclosure, the term "controllable scanning mirror" used herein relates to a solid-state mirror that can be controlled to steer the light beam incident thereupon, for optically scanning regions of the input image. In such a case, the at least one controllable scanning mirror is adjustable (namely, via tilting, rotation and so forth) in one dimension or in two dimensions to reflect the light beam towards the projection surface. Notably, the processor is configured to control the at least one scanning mirror for changing the direction in which the light beam is reflected. Examples of the at least one controllable scanning mirror include, but are not limited to, a micro-electro-mechanical systems (MEMS) mirror and a micro-opto-electro-mechanical systems (MOEMS) mirror.

For sake of simplicity and clarity, the term "at least one controllable scanning mirror" is hereinafter referred to as "a controllable scanning mirror".

Throughout the present disclosure, the term "projection surface" used herein relates to a surface adapted to facilitate rendering of at least two constituent regions of the input image. Notably, the projection surface has transmittance and reflectance specifications that are suitable for receiving the substantially collimated and monochromatic light beam to draw at least the first and second regions of the input image thereon. It will be appreciated that the first and second regions could be drawn over the projection surface from either or both of: a front side of the projection surface, a back side of the projection surface.

Optionally, the display apparatus includes a projection surface per eye of the user. In such a case, separate first and second regions for the left eye and the right eye of the user are rendered using the separate projection surfaces. The separate first and second regions for the left eye and the right eye of the user collectively constitute the first and second regions of the input image. Alternatively, optionally, a single projection surface is used for both eyes of the user on a shared basis. In such a case, the single projection surface is used to render the separate first and second regions for both the left eye and the right eye of the user on a shared basis.

Optionally, the projection surface is a retina of the user's eye. In such a case, the separate first and second regions are drawn over the retinas of both the left eye and the right eye of the user.

Throughout the present disclosure, the term "means for detecting gaze direction" used herein relates to specialized equipment for detecting a direction of gaze (namely, a gaze direction) of the user. The display apparatus uses the means for detecting gaze direction for determining aforesaid gaze direction via non-invasive techniques when the display apparatus is worn by the user. Beneficially, an accurate detection of the gaze direction facilitates the display apparatus to closely implement gaze contingency thereon. As an example, the means for detecting gaze direction may be employed to detect the gaze direction of the user's eye, for projecting the drawn second region on and around fovea of the user's eye and for projecting the drawn first region on the retina of the user's eye, of which the fovea is just a small part. Therefore, even upon a change in the gaze direction (namely, due to a movement of the user's eye), the drawn second region is projected on and around the fovea and the drawn first region is projected on the retina, for implementing active foveation in the display apparatus.

It is to be understood that the means for detecting gaze direction may also be referred to as a "means for tracking a gaze direction", a "gaze-tracking system", an "eye-tracker system", or a "gaze-tracking unit".

The processor is coupled in communication with the at least one light source, the at least one controllable scanning mirror and the means for detecting the gaze direction. In an embodiment, the processor is implemented by way of hardware, software, firmware or a combination of these, suitable for controlling the operation of the display apparatus. Notably, the processor is configured to control the operation of the display apparatus to process the input image and display the visual scene to the user, when the user uses the display apparatus (for example, by wearing the display apparatus on his/her head).

The processor is configured to obtain the input image and determine, based upon the detected gaze direction of the user, the region of visual accuracy of the input image. Throughout the present disclosure, the term "input image" used herein relates to an image that represents (namely, depicts) the visual scene that is to be displayed via the display apparatus. In other words, the input image represents the simulated environment that is to be presented to the user.

In an embodiment, the input image is obtained from an imaging device coupled to the display apparatus. In such a case, the imaging device (for example, such as a pass-through digital camera) is configured to capture an image of a real-world environment as the input image.

In another embodiment, the input image is obtained from a memory unit coupled in communication with the processor. Optionally, the memory unit is implemented by way of hardware, software, firmware or a combination of these, suitable for storing the input image. The input image is stored in a suitable format, for example, such as Motion Picture Experts Group (MPEG), Joint Photographic Experts Group (JPEG), Tagged Image File Format (TIFF), Portable Network Graphics (PNG), Graphics Interchange Format (GIF), Bitmap file format (BMP) and the like.

In yet another embodiment, the input image is obtained from a host device, wherein the host device is coupled in communication with the processor via a network. The host device could be a host computer, a database server, and the like. Examples of such a network include, but are not limited to, Internet, radio network, Personal Area Network, Local Area Network, Metropolitan Area Network and Wide Area Network.

In still another embodiment, the input image is a computer generated image. In such a case, the processor is configured to generate the input image.

Furthermore, it is to be understood that the term "region of visual accuracy" relates to a region of the input image whereat the detected gaze direction of the eyes of the user is directed (namely, focused) when the user views the input image. Therefore, the region of visual accuracy is a fixation region within the input image. In other words, the region of visual accuracy is a region of interest within the input image, and is projected onto the fovea of the user's eyes. Therefore, the region of visual accuracy relates to a region resolved to a much greater detail as compared to the remaining region(s) of the input image, when the input image is viewed by the human visual system (namely, the user's eyes). As an example, an input image IMG may depict a visual scene of a park having a fountain, a swing-set and a pond. Specifically, regions R1, R2 and R3 of the input image IMG may depict the fountain, the swing-set and the pond respectively. In such an example, if the gaze direction of the user is detected to lie substantially towards the pond, the region R3 of the input image IMG depicting the pond would be determined as a region of visual accuracy of the input image IMG.

The processor is configured to generate the pixel data corresponding to at least the first region and the second region of the input image, wherein the second region substantially corresponds to the region of visual accuracy of the input image or the part of the region of visual accuracy, while the first region substantially corresponds to the remaining region of the input image or the part of the remaining region. The term "pixel data" used herein relates to information pertaining to a single pixel or a set of pixels within an entire pixel array associated with a given region of the input image. For example, the pixel data may include information such as, but not limited to size of pixels of the given region, colors of the pixels of the given region, intensity associated with the pixels of the given region, positions of the pixels of the given region, arrangement of the pixels of the given region, and total number of the pixels of the given region.

Typically, the first region relates to a substantially-large region of the input image whereas the second region relates to a substantially-small region of the input image. In other words, generally, a size (namely, dimensions) of the second region is relatively smaller as compared to a size of the first region since the second region substantially corresponds to only a portion of the input image whereat the detected gaze direction of the eyes is focused (namely, at the region of visual accuracy of the input image) whereas the first region substantially corresponds to the remaining region of the input image. Therefore, the first region may be referred to as a "context region" of the input image whereas the second region may be referred to as a "focus region" of the input image. It will be appreciated that the first and second regions are separate regions of a same input image depicting the visual scene, wherein the first and second regions collectively constitute the visual scene upon optical combination of their projections.

In the aforesaid example describing the input image IMG, the second region may substantially correspond to the region R3 which is the region of visual accuracy of the input image IMG. Furthermore, in such an example, the first region may substantially correspond to the regions R1 and R2, which are the remaining regions of the input image IMG.

The first region is to have the first resolution whereas the second region is to have the second resolution, the second resolution being higher than the first resolution. The second resolution is higher than the first resolution since the second region is to be typically projected by the display apparatus on and around the fovea of the user's eyes, whereas the first region is to be projected by the display apparatus upon a remaining region of the retina of the user's eyes. Such resolution of the first and second regions allow for emulating visual characteristics of the human visual system when the input image is viewed by the user of the display apparatus.

Optionally, the first and second resolutions are to be understood in terms of angular resolution. In other words, pixels per degree indicative of the second resolution are higher than pixels per degree indicative of the first resolution. As an example, the fovea of the eye of the user corresponds to 2 degrees of visual field and receives a projection of the drawn second region of angular cross section width equal to 114 pixels indicative of 57 pixels per degree. Therefore, an angular pixel size corresponding to the second region would equal $2/114$ or 0.017. Furthermore, in such an example, the retina of the eye corresponds to 180 degrees of visual field and receives a projection of the drawn first region of angular cross section width equal to 2700 pixels indicative of 15 pixels per degree. Therefore, an angular pixel size corresponding to the first region would equal 180/2700 or 0.067. As calculated, the angular pixel size corresponding to the first region is clearly much larger than the angular pixel size corresponding to the second region. However, a perceived angular resolution indicated by a total number of pixels is greater for the first region as compared to the second region since the second region substantially corresponds to only the region of visual accuracy of the input image whereas the first region substantially corresponds to the remaining region of visual accuracy of the input image. It will be appreciated that the aforesaid angular resolution also relates to pixel density (namely, pixels per unit area). Therefore, pixels per unit area corresponding to the second region are higher than pixels per unit area corresponding to the first region. In other words, the pixel data corresponding to the first region may include a sparse arrangement of pixels of the first region (to implement the first resolution) whereas the pixel data corresponding to the second region may include a dense arrangement of pixels of the second region (to implement the second resolution).

In an embodiment, the pixel data is generated separately for the first region and the second region. Optionally, in such a case, the pixel data is stored separately in two frame buffers, wherein one frame buffer is configured to store the pixel data corresponding to the first region and another frame buffer is configured to store the pixel data corresponding to the second region. In another embodiment, the pixel data is generated collectively for the first region and the second region. Optionally, in such a case, the pixel data is stored in a single frame buffer. More optionally, in such a case, the aforesaid two frame buffers are combined into the single frame buffer. It is to be understood that the term "frame buffer" relates to a portion of a memory that is used to drive the light source. In operation, the light source is driven based upon the aforesaid pixel data to draw the first and second regions over the projection surface. Furthermore, each frame of data in a given frame buffer comprises the pixel data pertaining to all pixels of a region (namely, the first region or the second region) associated with the given frame buffer.

Optionally, the display apparatus is associated with a logic circuitry, wherein the logic circuitry is to be employed for presenting the projections of the drawn first and second regions of the input image, to the user of the display apparatus. It will be appreciated that the projections of the drawn first and second regions are constituent projections of the visual scene that is to be presented to the user via the display apparatus. Optionally, the logic circuitry comprises at least the host device; a first frame buffer for storing pixel data corresponding to the first region of the input image and a second frame buffer for storing pixel data corresponding to the second region of the input image, wherein the first and second frame buffers are coupled in communication with the host device; and a logic selection circuit for selecting pixel data stored in either or both of the first frame buffer and the second frame buffer. Furthermore, optionally, the logic circuitry comprises at least one high bandwidth bus between at least one of: the host device and the first frame buffer, the host device and the second frame buffer, the first frame buffer and the logic selection circuit, the second frame buffer and the logic selection circuit, the logic selection circuit and the light source, the logic selection circuit and the controllable scanning mirror. In operation, at a given time, the logic selection circuit is configured to select either or both of the first and second frame buffers, based upon which region of the input image is to be drawn at the given time. Consequently, the processor is configured to drive the light source based upon the pixel data that is stored in the selected first frame buffer and/or second frame buffer.

It will be appreciated that pixel data corresponding to more than two regions having more than two resolutions can also be generated. The second region (namely, the focus region) could correspond to only a part of the region of visual accuracy, when the more than two resolutions are implemented. In such a case, a center portion of the region of visual accuracy would have the highest resolution, and the resolutions would gradually decrease while going outwards, away from the aforesaid center portion. Furthermore, the first region (namely, the context region) could correspond to only a part of the remaining region, when the more than two resolutions are implemented. As an example, the processor may be configured to generate pixel data corresponding to a third region of the input image, wherein the third region is to have a third resolution. In such an example, the third resolution may be higher than the first resolution, but lesser than the second resolution. Therefore, in such an example, the second region may correspond to the center portion of the region of visual accuracy whereas the third region may substantially correspond to a peripheral portion of the region of visual accuracy that lies between the second region and the first region. In such an example, the logic circuitry may further comprise a third frame buffer for storing pixel data corresponding to the third region of the input image. Therefore, in operation, at a given time, the logic selection circuit is configured to select at least one of the first frame buffer, second frame buffer and third frame buffer, based upon which region of the input image is to be drawn at the given time. Consequently, the processor is configured to drive the light source based upon pixel data that is stored in the selected frame buffer(s).

Optionally, the logic selection circuit is configured to blend pixel data stored in the first and second frame buffers to generate the pixel data corresponding to the third region. Optionally, in this regard, the pixel data corresponding to the second region is low-pass filtered (namely, passed through a low-pass filter) and combined with the pixel data corresponding to the first region to generate the pixel data corresponding to the third region. It will be appreciated that the aforesaid low pass filtering of the pixel data corresponding to the second region allows for reducing contrast of the second region, thereby, reducing visible artifacts and implementing a smooth blending effect. Furthermore, optionally, the logic selection circuit is configured to employ at least one image processing algorithm whilst implementing the aforesaid blending operation. It will be appreciated that such a blended distribution of the pixel data along a periphery of the first and second regions of the input image provides a resolution distribution that is imperceptible under normal viewing conditions, thereby, enhancing an appearance of the visual scene.

The processor is configured to control the at least one light source and the at least one controllable scanning mirror to draw the first region and the second region of the input image over the projection surface. In operation, the processor controls the light source to emit the light beam therefrom. The light beam is incident upon the controllable scanning mirror wherefrom the light beam is reflected towards the projection surface for drawing the first region and the second region of the input image. Notably, the scanning mirror is controlled to change (namely, adjust) the direction in which the light beam is reflected. The light source is driven based upon the pixel data corresponding to at least the first region and the second region of the input image to draw the first region and the second region over the projection surface. Furthermore, the region of the visual accuracy of the input image changes with change in the gaze direction of the user. Consequently, locations of the first and second regions of the input image change with change in the gaze direction of the user. In such an instance, the light source and the controllable scanning mirror are controlled in a manner that the light beam is directed towards current locations of the first and second regions of the input image for drawing the first and second regions over the projection surface, based upon a current gaze direction of the user. When the first and second regions are drawn over the projection surface, the projection surface acts as an optical combiner wherefrom a combination of a projection of the drawn first region and a projection of the drawn second region is directed towards the user's eyes. The combined projections of the drawn first and second regions constitute a projection of the visual scene.

Optionally, the first region and the second region of the input image are drawn substantially simultaneously over the projection surface. Beneficially, such a manner of drawing the first and second regions of the input images minimizes time lag in optical combination thereof, thereby, providing the user with a seamless viewing experience of the visual scene.

Optionally, a nature of the light beam (for example, wavelength of the light beam, intensity of the light beam, and so forth) emitted from the light source is adjusted based upon the generated pixel data corresponding to the first and second regions of the input image whilst drawing the first and second regions over the projection surface.

Optionally, a single scanning pattern is to be swept by the at least one controllable scanning mirror for drawing the first region and the second region. The term "scanning pattern" relates to a pattern that defines a manner in which the light beam scans the projection surface to draw the first region and the second region of the input image. It will be appreciated that a shape of a given scanning pattern is a function of movement of the controllable scanning mirror about its horizontal and vertical axes whilst drawing a given region over the projection surface. In other words, the movement of the controllable scanning mirror for drawing the given region is based upon the given scanning pattern associated with the given region. Whilst sweeping the single scanning pattern across the projection surface, at a given time, the logic selection circuit is configured to select either of the first and second frame buffers, based upon which region of the input image is to be drawn at the given time. Consequently, the light beam is controlled to sweep the single scanning pattern based upon the pixel data that is stored in the selected frame buffer. It will be appreciated that when the logic circuitry comprises more than two frame buffers for storing pixel data corresponding to the more than two regions, one frame buffer is selected at a given time, based upon which region of the input image is to be drawn at the given time. Consequently, the light beam is controlled to sweep the single scanning pattern based upon the pixel data stored in the selected frame buffer. As an example, when the logic circuitry comprises the first, the second and the third frame buffers, only one of the aforesaid frame buffers may be selected (via the logic selection circuit) to drive the light beam according to pixel data stored therein.

Optionally, a first scanning pattern to be swept by the at least one controllable scanning mirror for drawing the first region is different from a second scanning pattern to be swept by the at least one controllable scanning mirror for drawing the second region, wherein the second scanning pattern is to have at least one additional ripple function in a direction that is substantially perpendicular to a current scanning direction. The term "ripple function" relates to a signal (for example, such as a periodic signal) superimposed upon the second scanning pattern, that further allows for controlling the manner in which the light beam scans the projection surface to draw the second region. It will be appreciated that the at least one additional ripple function beneficially increases the resolution of the second region (namely, the focus region) with respect to the first region.

Optionally, the first and second scanning patterns are different with regards to at least one of: scanning direction, scan line spacing, scanning duration, scanning speed.

In an example implementation, the first scanning pattern for drawing the first region has sparse scan line spacing whereas the second scanning pattern for drawing the second region has dense scan line spacing. Therefore, pixel density within the second region is higher than pixel density within the first region. Therefore, the different first and second scanning patterns allow for drawing the first and second regions with different resolutions wherein the second resolution (of the second region) is higher than the first resolution (of the first region), thereby, emulating visual characteristics of the human visual system when the user of the display apparatus views the visual scene.

Optionally, the first scanning pattern is a raster scanning pattern, the second scanning pattern is a raster scanning pattern with an additional ripple function in a direction that is substantially perpendicular to a raster scan direction. Optionally, the additional ripple function associated with the second scanning pattern is a high frequency sinusoidal signal. Typically, in a given raster scanning pattern, the light beam is swept both horizontally and vertically across the projection surface in a line-by-line manner, wherein the horizontal sweep allows for drawing a row of pixels of a given region and the vertical sweep allows for drawing all rows of the pixels of the given region. In other words, the light beam is swept across the projection surface, one row at a time, for all the rows of pixels. Notably, the aforesaid horizontal scanning of a given row may be bidirectional, namely, from left to right direction or from right to left direction within the given row. Furthermore, the vertical sweep across the rows may be from a top row to a bottom row or from the bottom row to the top row. Furthermore, optionally, the light beam is turned off whilst scanning (namely, horizontally retracing) from end of one row to a beginning of its subsequent row, thereby creating a pattern of illuminated spots in a row as the light beam moves across each row. Moreover, optionally, upon scanning all rows, the light beam is directed towards a starting point of the raster scanning pattern, thereby constituting a vertical retrace.

For sake of simplicity and clarity, the "first scanning pattern that is a raster scanning pattern" is hereinafter referred to as a "first raster scanning pattern". Similarly, the "second scanning pattern that is a raster scanning pattern with an additional ripple function in a direction that is substantially perpendicular to a raster scan direction" is hereinafter referred to as a "second raster scanning pattern having ripple".

In an embodiment, the display apparatus further comprises at least one base onto which the at least one controllable scanning mirror is mounted; and at least a first actuator and a second actuator associated with the at least one base, wherein the first actuator is operable to control a tilt of the at least one scanning mirror according to a saw-tooth function in a Y direction, the second actuator is operable to control the tilt of the at least one scanning mirror according to a sinusoidal function in an X direction, further wherein the first actuator is operable to control the tilt of the at least one scanning mirror according to the additional ripple function in the Y direction. The term "base" used herein relates to a structure (for example, such as a mirror mount including plates, adjustment screws, and so forth) whereupon the controllable scanning mirror is mounted. Optionally, the at least one base is arranged upon a foundation in a stack-like manner. Furthermore, optionally, the at least one base is coupled to the foundation via at least one actuator (for example, such as the first actuator and the second actuator), wherein the foundation is configured to provide support to the aforesaid arrangement of the at least one base and the controllable scanning mirror. As an example, the foundation may be implemented as a micro-electro-mechanical systems chip base (namely, chip substrate) that is soldered to a printed circuit board. Furthermore, the at least one base is associated with at least the first and second actuators that are collectively operable to adjust the at least one controllable scanning mirror for sweeping the first raster scanning pattern and the second raster scanning pattern having ripple. In operation, for sweeping the first raster scanning pattern, the first and second actuators are driven according to the saw-tooth function in the Y direction and the sinusoidal function in the X direction, respectively. Furthermore, for sweeping the second raster scanning pattern having ripple, the first actuator is driven according to the saw-tooth function and the additional ripple function in the Y direction whereas the second actuator is driven according to the sinusoidal function in the X direction. The additional ripple function causes the controllable scanning mirror to rapidly vibrate in the direction that is substantially perpendicular to the raster scan direction. As an example, when the raster scan direction is horizontal, the additional ripple function causes the controllable scanning mirror to vibrate vertically. It will be appreciated that different saw-tooth and sinusoidal functions are employed for sweeping the first raster scanning pattern and the second raster scanning pattern having ripple. Optionally, the processor is configured to generate the saw-tooth function, sinusoidal function and the additional ripple function for driving at least the first actuator and the second actuator in the aforesaid manner.

In another embodiment, the display apparatus comprises at least two bases onto which the at least one controllable scanning mirror is mounted; and at least a first actuator, a second actuator and a third actuator associated with the at least two bases, wherein the first actuator is operable to control a tilt of the at least one scanning mirror according to a saw-tooth function in a Y direction, the second actuator is operable to control the tilt of the at least one scanning mirror according to a sinusoidal function in an X direction, and the third actuator is operable to control the tilt of the at least one scanning mirror according to the additional ripple function in the Y direction. In operation, for sweeping the first raster scanning pattern, the first and the second actuators are driven according to the saw-tooth function in the Y direction and the sinusoidal function in the X direction, respectively. Furthermore, for sweeping the second raster scanning pattern having ripple, the first, second and third actuators are driven according to the saw-tooth function, the sinusoidal function and the additional ripple function, respectively. It will be appreciated that different saw-tooth and sinusoidal functions are employed for sweeping the first raster scanning pattern and the second raster scanning pattern having ripple. Optionally, the processor is configured to generate the saw-tooth function, sinusoidal function and the additional ripple function for driving at least the first actuator, the second actuator and the third actuator in the aforesaid manner.

Optionally, the first scanning pattern is a Lissajous scanning pattern, the second scanning pattern is a Lissajous scanning pattern with an additional ripple function in an X direction and an additional ripple function in a Y direction. Typically, in a given Lissajous scanning pattern, the light beam is swept both horizontally and vertically across the projection surface in a non-linear trajectory that is based on Lissajous curves. It will be appreciated that Lissajous scanning patterns allow for scanning larger portions (or areas) of the projection surface as compared to raster scanning patterns, in a given duration of time. Beneficially, the additional ripple functions in the X and Y directions allow for increasing the resolution of the second region (namely, the focus region) with respect to the first region.

For sake of simplicity and clarity, the "first scanning pattern that is a Lissajous scanning pattern" is hereinafter referred to as a "first Lissajous scanning pattern". Similarly, the "second scanning pattern that is a Lissajous scanning pattern with an additional ripple function in an X direction and an additional ripple function in a Y direction" is hereinafter referred to as a "second Lissajous scanning pattern having ripples".

In an embodiment, the display apparatus comprises at least one base onto which the at least one controllable scanning mirror is mounted; and at least a first actuator and a second actuator associated with the at least one base, wherein the first actuator is operable to control a tilt of the at least one scanning mirror according to a sinusoidal function in the Y direction, the second actuator is operable to control the tilt of the at least one scanning mirror according to a sinusoidal function in the X direction, further wherein the first actuator is operable to control the tilt of the at least one scanning mirror according to the additional ripple function in the Y direction, and the second actuator is operable to control the tilt of the at least one scanning mirror according to the additional ripple function in the X direction. The at least one base is associated with at least the first and second actuators that are collectively operable to adjust the at least one controllable scanning mirror for sweeping the first Lissajous scanning pattern and the second Lissajous scanning pattern having ripples. In operation, for sweeping the first Lissajous scanning pattern, the first and second actuators are driven according to the sinusoidal functions in the Y direction and the X direction, respectively. Furthermore, for sweeping the second Lissajous scanning pattern having ripples, the first actuator is driven according to the sinusoidal function and the additional ripple function in the Y direction whereas the second actuator is driven according to the sinusoidal function and the additional ripple function in the X direction. It will be appreciated that same or different sinusoidal functions are employed for sweeping the first Lissajous scanning pattern and the second Lissajous scanning pattern having ripples. Optionally, the processor is configured to generate the sinusoidal functions and the additional ripple functions for driving at least the first actuator and the second actuator in the aforesaid manner.

In another embodiment, the display apparatus comprises at least two bases onto which the at least one controllable scanning mirror is mounted; and at least a first actuator, a second actuator, a third actuator and a fourth actuator associated with the at least two bases, wherein the first actuator is operable to control a tilt of the at least one scanning mirror according to a sinusoidal function in the Y direction, the second actuator is operable to control the tilt of the at least one scanning mirror according to a sinusoidal function in the X direction, the third actuator is operable to control the tilt of the at least one scanning mirror according to the additional ripple function in the Y direction, and the fourth actuator is operable to control the tilt of the at least one scanning mirror according to the additional ripple function in the X direction. In operation, for sweeping the first Lissajous scanning pattern, the first and the second actuators are driven according to the sinusoidal functions in the Y direction and the X direction, respectively. Furthermore, for sweeping the second Lissajous scanning pattern having ripples, the first, second, third and fourth actuators are driven according to the sinusoidal function in the Y direction, the sinusoidal function in the X direction, the additional ripple function in the Y direction and the additional ripple function in the X direction, respectively. It will be appreciated that same or different sinusoidal functions are employed for sweeping the first Lissajous scanning pattern and the second Lissajous scanning pattern having ripples. Optionally, the processor is configured to generate the aforesaid sinusoidal functions and the additional ripple functions for driving at least the first actuator, the second actuator, the third actuator and the fourth actuator in the aforesaid manner.

It will be appreciated that the at least one base is stackable upon the foundation. In an example implementation, when the display apparatus comprises the at least two bases, the at least one controllable scanning mirror is stacked upon a topmost base of the aforesaid stack-like arrangement. Specifically, a first base may be stacked upon the foundation and a second base may be stacked upon the first base, the at least one controllable scanning mirror being substantially rigidly mounted onto the second base. In such an example, the second base may be pivotably connected to the first base via an element. Such an element may be a bending rod-type construct. Notably, the first base may be required to have a substantially large tilt angle in the X direction and the Y direction, thereby, allowing for the at least one controllable scanning mirror to cover a wide field of view, whereas the second base may be required to have a substantially small tilt angle. Furthermore, an oscillatory or vibratory motion of the first base may be required to be controlled according to a resonant frequency. For example, the resonant frequency may be 100 Hz. Moreover, an oscillatory or vibratory motion of the second base may be required to be controlled according to a very high frequency (for example, such as a frequency lying within 10 kHz and 1 MHz). Therefore, separate actuators are to be employed for moving (namely, actuating) the first and the second base in the aforesaid manner. Beneficially, using separate actuators for moving separate bases of the aforesaid stack-like arrangement allows for precisely controlling movement of the at least one scanning mirror. For example, in such an implementation, the first actuator and the second actuator may be employed to control movement of the first base whereas the third actuator (and optionally, the fourth actuator) may be employed to control movement of the second base.

Optionally, the at least one light source is operable to employ a first power for drawing the first region, and to employ a second power for drawing the second region, the first power being greater than the second power. The term "power" used herein relates to energy employed per unit time by the light source, for drawing the first and second regions of the input image over the projection surface. In such a case, since greater power is employed for drawing the first region, an intensity of the light beam for drawing the first region is higher than an intensity of the light beam for drawing the second region. Consequently, such use of the first and second powers allows for the pixels of the first region to be brighter than the pixels of the second region. Notably, since the first resolution (namely, the pixel density) of the first region is lower as compared to the second resolution (namely, the pixel density) of the second region, fewer pixels appear to be "lit up" in the first region as compared to the second region. Therefore, it will be appreciated that with the aforesaid use of greater power for drawing the first region, a power density of the first region is substantially similar to a power density of the second region. Consequently, an overall brightness of the first and second regions appears to be substantially similar even with different pixel densities of the first and second regions.

Optionally, the at least one light source and the at least one controllable scanning mirror are operable to employ a first scanning speed for drawing the first region, and to employ a second scanning speed for drawing the second region, the first scanning speed being slower than the second spanning speed. The term "scanning speed" relates to a rate at which the light beam moves across the projection surface to draw the first and second regions. It will be appreciated that employing the slower first scanning speed for the first region allows for increasing a power that is to be provided to the pixels of the first region. Since the first resolution (namely, the pixel density) of the first region is lower as compared to the second resolution (namely, the pixel density) of the second region, the aforesaid first and second scanning speeds allow for the power density of the first region to be substantially similar to the power density of the second region, in a given time period. As a result, the first and second regions appear to have uniform (or substantially similar) brightness.

It will be appreciated that when the drawn first and second regions of the input image have substantially similar brightness, the visual scene constituted by their projections also appears uniformly bright. Therefore, a difference in pixel densities of the drawn first and second regions is imperceptible to the user's eyes.

Optionally, the first scanning pattern is to also have at least one additional ripple function in a direction that is substantially perpendicular to the current scanning direction, wherein an amplitude of the at least one additional ripple function of the first scanning pattern is smaller than an amplitude of the at least one additional ripple function of the second scanning pattern. In such a case, the at least one additional ripple function of the first scanning pattern is superimposed upon the first scanning pattern, thereby, allowing for further control of the manner in which the light beam scans the projection surface to draw the first region. It will be appreciated that the at least one additional ripple function of the first scanning pattern beneficially increases brightness of the first region. Notably, the first resolution (namely, the pixel density) of the first region is lower as compared to the second resolution (namely, the pixel density) of the second region. However, the at least one additional ripple function of the first scanning pattern accommodates for the difference in resolutions of the first and the second regions, by increasing a number of pixels of the first region that appear to be "lit up" whilst drawing the first region. Therefore, the power density of the first region becomes substantially similar to the power density of the second region. As a result, the overall brightness of the first and the second regions is substantially similar.

It will be appreciated that the amplitude of the at least one additional ripple function of the first scanning pattern is smaller than the amplitude of the at least one additional ripple function of the second scanning pattern, since the at least one additional ripple function of the first scanning pattern is employed for maintaining uniform brightness within the drawn first and second regions whereas the at least one additional ripple function of the second scanning pattern is employed to provide the second resolution of the second region.

Optionally, the display apparatus further comprises an exit optical element. The exit optical element relates to an optical device configured to direct the optically combined projections of the drawn first region and the second region, towards the user's eyes, when the display apparatus is worn by the user. Furthermore, optionally, the exit optical element is configured to alter an optical path and/or optical characteristics of the projection of the first region and/or the projection of the second region. In one example, the exit optical element may magnify a size (or angular dimensions) of the projections of the drawn first and second regions. In such a case, use of a magnifying exit optical element allows for use of a dimensionally small projection surface within the display apparatus.

Optionally, the exit optical element is implemented by way of at least one of: a convex lens, a plano-convex lens, a Liquid Crystal (LC) lens, a liquid lens, a Fresnel lens, a spherical lens, a chromatic lens.

Optionally, the display apparatus further comprises a light-sensing element for sensing the intensity of light beam and means for stopping the light beam from reaching the users eye, wherein the processor is configured to detect when the intensity of the light beam exceeds a predefined threshold value, and to use said means to stop the light beam when the intensity of the light beam exceeds the predefined threshold value. In such a case, the predefined threshold value relates to an upper safe operation threshold value associated with the light source. Such predefined threshold values are based upon commonly known and practiced safety guidelines. Throughout the present disclosure, the term "fight-sensing element" used herein relates to a specialized device (for example, such as a light sensor) comprising at least one light-sensitive component for detecting the intensity of the light beam incident thereupon. In operation, the processor coupled to the light-sensing element obtains a value of the detected intensity of the light beam, and consequently, detects when the intensity of the light beam exceeds the predefined threshold value. Optionally, the light-sensing element is implemented by way of at least one of: a photo resistor, a photo diode, a photo transistor. As an example, the light-sensing element is implemented by way of a chip including an array of the aforesaid light-sensitive components. Furthermore, the term "means for stopping the light beam" relates to equipment for blocking (namely, obstructing) the light beam from reaching the user's eyes. Examples of the means for stopping the light beam include, but are not limited to, an opaque shutter, an interlock mechanism associated with the light source, a glass filter, a polycarbonate filter. It will be appreciated that the aforesaid means allows for stopping harmful light beam having intensity greater than the predefined threshold value, from reaching the user's eyes. Therefore, the light-sensing element and the means for stopping the light beam ensure protection (namely, safety) of the user's eyes, whilst the user uses the display apparatus.

Optionally, the light-sensing element is arranged on an optical path of the light beam. Furthermore, in this regard, the light-sensing element could also be arranged on an optical path of the projection of the drawn first region or an optical path of the projection of the drawn second region, since the first and second regions are drawn via the light beam. In an example implementation, the light-sensing element may be arranged between the light source and the controllable scanning mirror. In another example implementation, the light-sensing element may be arranged between the controllable scanning mirror and the projection surface. In yet another example implementation, the light-sensing element may be arranged between the projection surface and the user's eye, on the optical path of the projections of the drawn first and second regions.

In an embodiment, the light-sensing element is substantially transparent. In such a case, the light-sensing element is configured to: (i) allow the light beam incident thereupon to completely pass therethrough, when the intensity of the light beam is equal to or lower than the predefined threshold value; and (ii) block the light beam incident thereupon from passing therethrough, if the intensity of the light beam is greater than the predefined threshold value. In such a case, the light-sensing element blocks the light beam by way of at least one of: reflection of the light beam, absorption of the light beam.

In another embodiment, the light-sensing element is substantially opaque. Optionally, in such a case, the display apparatus comprises a partially-reflective optical element arranged on the optical path of the light beam, wherein the partially-reflective optical element is configured to reflect at least a portion of the light beam towards the light-sensing element, and to allow the light beam to pass through the partially-reflective optical element when the intensity of the light beam is equal to or lower than the predefined threshold value. In operation, at least a portion of the light beam is reflected by the partially-reflective optical element towards the light-sensing element whereat the intensity of the light beam is detected. If the intensity of the light beam is greater than the predefined threshold value, the entire light beam is reflected towards the light-sensing element to ensure protection of the user's eyes. However, if the intensity of the light beam is equal to or lower than the predefined threshold value, the partially-reflective optical element is configured to pass a remaining portion of the light beam therethrough. It will be appreciated that only a small fraction of the light beam may be reflected towards the light-sensing element for the aforementioned operation.

Optionally, the display apparatus further comprises an accelerometer, the accelerometer being operable to sense a pattern in which the at least one controllable scanning mirror vibrates; and the means for stopping the light beam from reaching the user's eye, wherein the processor is configured to detect when the sensed pattern is different from a predefined pattern that is recognized for the at least one controllable scanning mirror, and to use said means to stop the light beam when the sensed pattern is different from the predefined pattern. Conventionally, the predefined pattern associated with vibration of the controllable scanning mirror is cyclic. However, the sensed pattern in which the controllable scanning mirror vibrates may be detected to be substantially different from the expected predefined pattern associated therewith, due to inefficiency of the processor, wear and tear of the controllable scanning mirror, anomalous deflection of the controllable scanning mirror, and the like. Beneficially, the aforesaid arrangement of the accelerometer and the means for stopping the light beam allow for stopping the light beam from reaching the user's eye in an event of such unexpected and undesired vibrations of the controllable scanning mirror, for protection of the user's eye. As an example, according to the predefined pattern that is recognized for the scanning mirror, a time period between successive cyclic vibrations may be of the order of a few milliseconds. In such a case, the accelerometer may sense a pattern in which the time period between the successive cycles is of the order of a few microseconds. Therefore, since the scanning mirror is detected to be vibrating much faster than an expected rate, the means for stopping the light beam may be used to stop the light beam from reaching the user's eye.

The present disclosure also relates to the method as described above. Various embodiments and variants disclosed above apply mutatis mutandis to the method.

Optionally, in the method the first scanning pattern swept by the at least one controllable scanning mirror for drawing the first region is different from the second scanning pattern swept by the at least one controllable scanning mirror for drawing the second region, wherein the second scanning pattern has the at least one additional ripple function in the direction that is substantially perpendicular to the current scanning direction. Optionally, in the method, the first scanning pattern is the raster scanning pattern, the second scanning pattern is the raster scanning pattern with the additional ripple function in a direction that is substantially perpendicular to the raster scan direction. Alternatively, optionally, in the method, the first scanning pattern is a Lissajous scanning pattern, the second scanning pattern is a Lissajous scanning pattern with an additional ripple function in an X direction and an additional ripple function in a Y direction.

Optionally, in the method, the first scanning pattern also has the at least one additional ripple function in a direction that is substantially perpendicular to the current scanning direction, wherein the amplitude of the at least one additional ripple function of the first scanning pattern is smaller than the amplitude of the at least one additional ripple function of the second scanning pattern.

Optionally, the method further comprises employing the first power for drawing the first region; and employing the second power for drawing the second region, the first power being greater than the second power.

Optionally, the method further comprises employing the first scanning speed for drawing the first region; and employing the second scanning speed for drawing the second region, the first scanning speed being slower than the second spanning speed.

Optionally, in the method, the display apparatus further comprises the light-sensing element and the means for stopping the light beam from reaching the user's eye, the method comprising sensing, via the light-sensing element, an intensity of the light beam; detecting when the intensity of the light beam exceeds a predefined threshold value; and using said means to stop the light beam when the intensity of the light beam exceeds the predefined threshold value.

Optionally, in the method, the display apparatus further comprises the accelerometer and the means for stopping the light beam from reaching the user's eye, the method comprising sensing, via the accelerometer, the pattern in which the at least one controllable scanning mirror vibrates; detecting when the sensed pattern is different from the predefined pattern that is recognized for the at least one controllable scanning mirror; and using said means to stop the light beam when the sensed pattern is different from the predefined pattern.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises at least one light source per eye, depicted as a light source 102 for a left eye and a light source 104 for a right eye of a user; at least one controllable scanning mirror per eye, depicted as a controllable scanning mirror 106 for the left eye and a controllable scanning mirror 108 for the right eye; means 110 for detecting a gaze direction of the user; and a processor 112 coupled in communication with the at least one light source 102 and 104, the at least one controllable scanning mirror 106 and 108, and means 110 for detecting the gaze direction. The at least one light source 102 and 104 is operable to emit a substantially collimated and monochromatic light beam. The at least one controllable scanning mirror 106 and 108 is arranged to reflect the light beam towards a projection surface (not shown), wherein the at least one scanning mirror 106 and 108 is to be controlled to change a direction in which the light beam is reflected. Furthermore, the gaze direction is to be detected when the display apparatus 100 in operation is worn by the user.

Figure 2A:
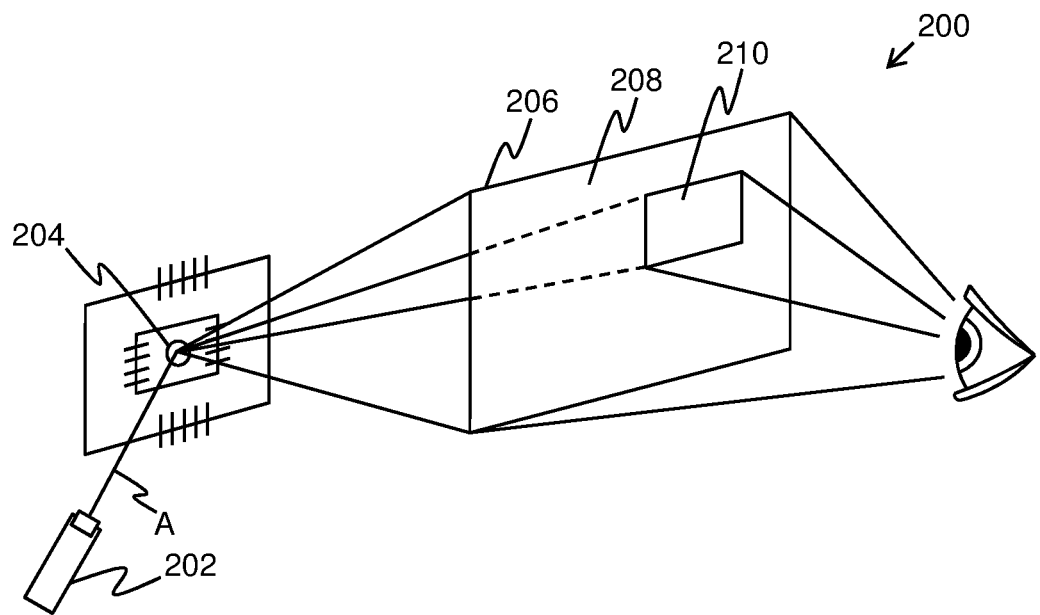
FIGS. 2A, 2B and 2C illustrate exemplary implementations of a display apparatus, in accordance with various embodiments of the present disclosure.
Figure 2B:
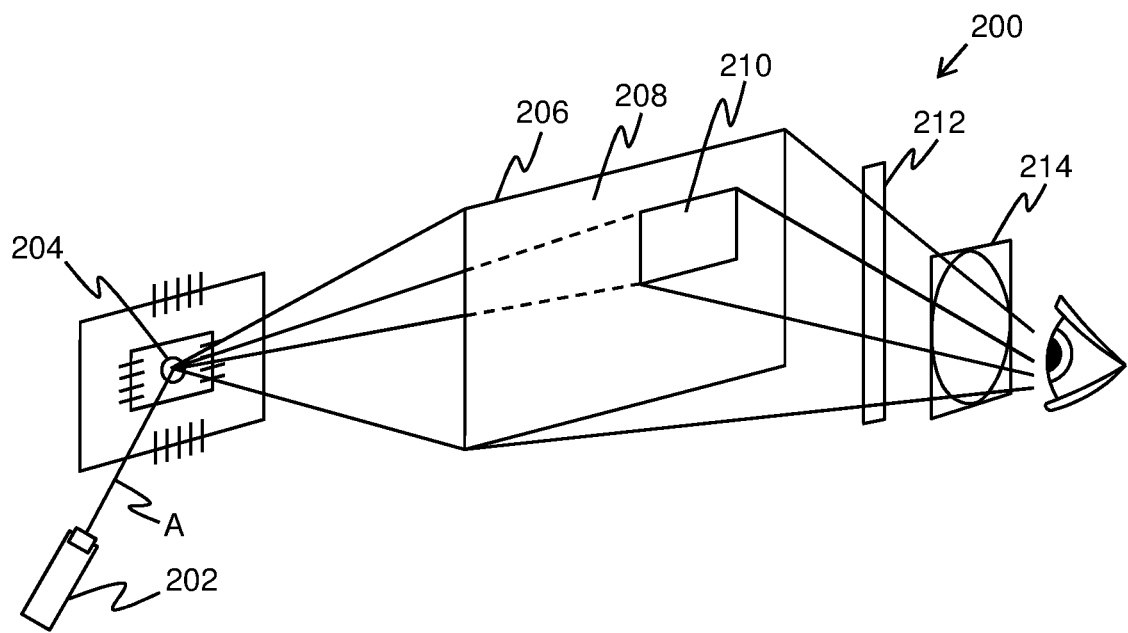
Figure 2C:
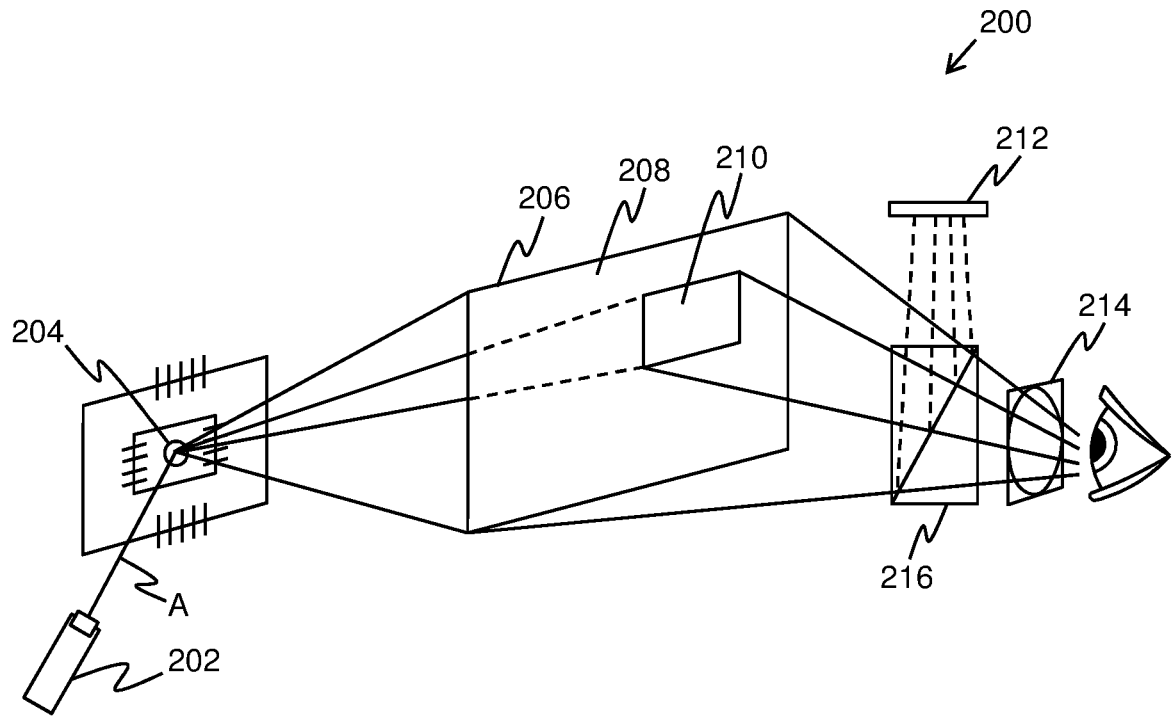

Referring to FIGS. 2A, 2B and 2C, illustrated are exemplary implementations of a display apparatus 200, in accordance with various embodiments of the present disclosure. It may be understood by a person skilled in the art that the FIGS. 2A, 2B and 2C include simplified arrangements for implementation of the display apparatus 200 for sake of clarity, which should not unduly limit the scope of the claims herein. The person skilled in the art will recognize many variations, alternatives, and modifications of embodiments of the present disclosure.

As shown in FIGS. 2A, 2B and 2C, the display apparatus 200 comprises at least one light source per eye, depicted as a light source 202; at least one controllable scanning mirror per eye, depicted as a controllable scanning mirror 204; means (not shown) for detecting a gaze direction of a user; and a processor (not shown) coupled in communication with the at least one light source 202, the at least one controllable scanning mirror 204 and the means for detecting the gaze direction. As shown, the light source 202 is operable to emit a substantially collimated and monochromatic light beam, depicted as a ray A. The controllable scanning mirror 204 is arranged to reflect the light beam A towards a projection surface 206, wherein the scanning mirror 204 is to be controlled to change a direction in which the light beam A is reflected. The gaze direction is to be detected when the display apparatus 200 in operation is worn by the user.

In operation, the processor is configured to (a) obtain an input image and determine, based upon the detected gaze direction of the user, a region of visual accuracy of the input image; (b) generate pixel data corresponding to at least a first region 208 and a second region 210 of the input image, wherein the second region 210 substantially corresponds to the region of visual accuracy of the input image or a part of the region of visual accuracy, while the first region 208 substantially corresponds to a remaining region of the input image or a part of the remaining region, wherein the first region 208 is to have a first resolution, while the second region 210 is to have a second resolution, the second resolution being higher than the first resolution; and (c) control the light source 202 and the controllable scanning mirror 204 to draw the first region 208 and the second region 210 of the input image over the projection surface 206.

In FIGS. 2B and 2C, the display apparatus further comprises a light-sensing element 212, the light-sensing element 212 being operable to sense an intensity of the light beam A; and means (not shown) for stopping the light beam A from reaching the user's eye. In such a case, the processor is configured to detect when the intensity of the light beam A exceeds a predefined threshold value, and to use said means to stop the light beam A when the intensity of the light beam A exceeds the predefined threshold value. Furthermore, the display apparatus 200 optionally comprises an exit optical element 214 configured to direct a projection of the drawn first region 208 and a projection of the drawn second region 210 towards the user's eye, when the display apparatus 200 is worn by the user.

In FIG. 2C, the display apparatus 200 further comprises a partially-reflective optical element 216 arranged on an optical path of the projections of the drawn first and second regions, wherein the partially-reflective optical element 216 is configured to direct the light beam A towards the light-sensing element 212. In such a case, if the intensity of the light beam A is detected to lie below the predefined threshold value, the projection of the drawn first region 208 and the projection of the drawn second region 210 are directed towards the user's eye, via the exit optical element 214.

Figure 3:
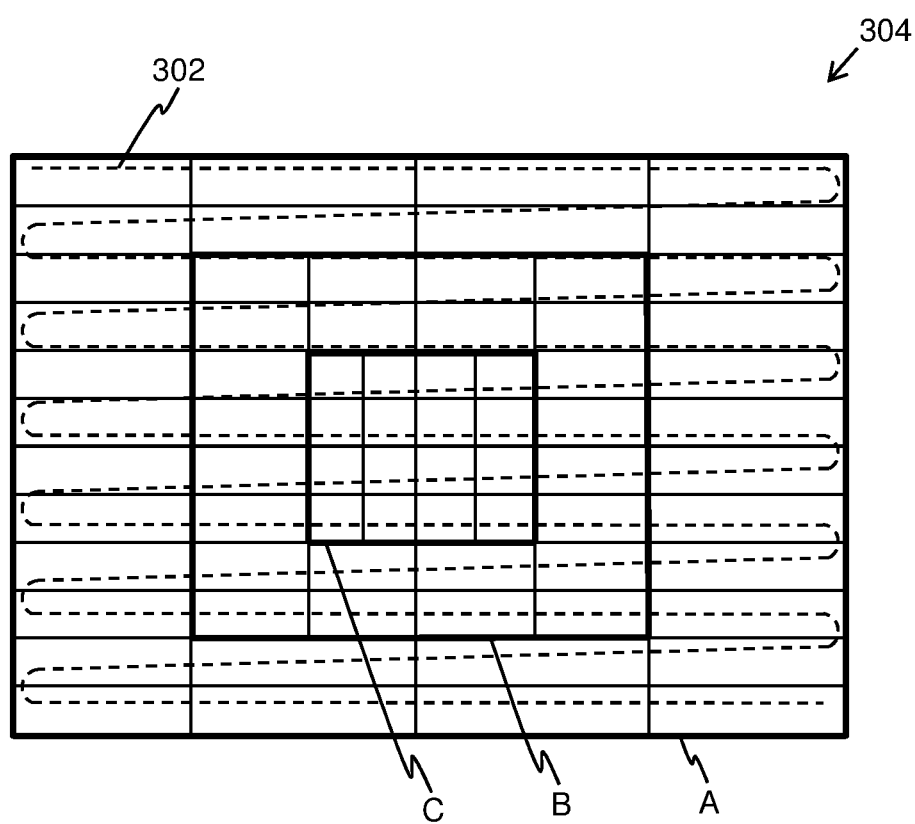
FIG. 3 illustrates a single scanning pattern to be swept by at least one controllable scanning mirror for drawing a first region, a second region and a third region of an input image, in accordance with an embodiment of the present disclosure.

Referring to FIG. 3, illustrated is a single scanning pattern 302 to be swept by at least one controllable scanning mirror (not shown) for drawing a first region, a second region and a third region of an input image 304, in accordance with an embodiment of the present disclosure. Notably, the first region, the second region and the third region are to be drawn over a projection surface (not shown). As shown, the first region (depicted as a region between boundaries A and B) has a first resolution, the second region (depicted as a region enclosed by boundary C) has a second resolution and the third region (depicted as a region between boundaries B and C) has a third resolution, wherein the third resolution is higher than the first resolution but lesser than the second resolution. As shown, the resolution may change both horizontally and vertically across the input image 304.

Figure 4:
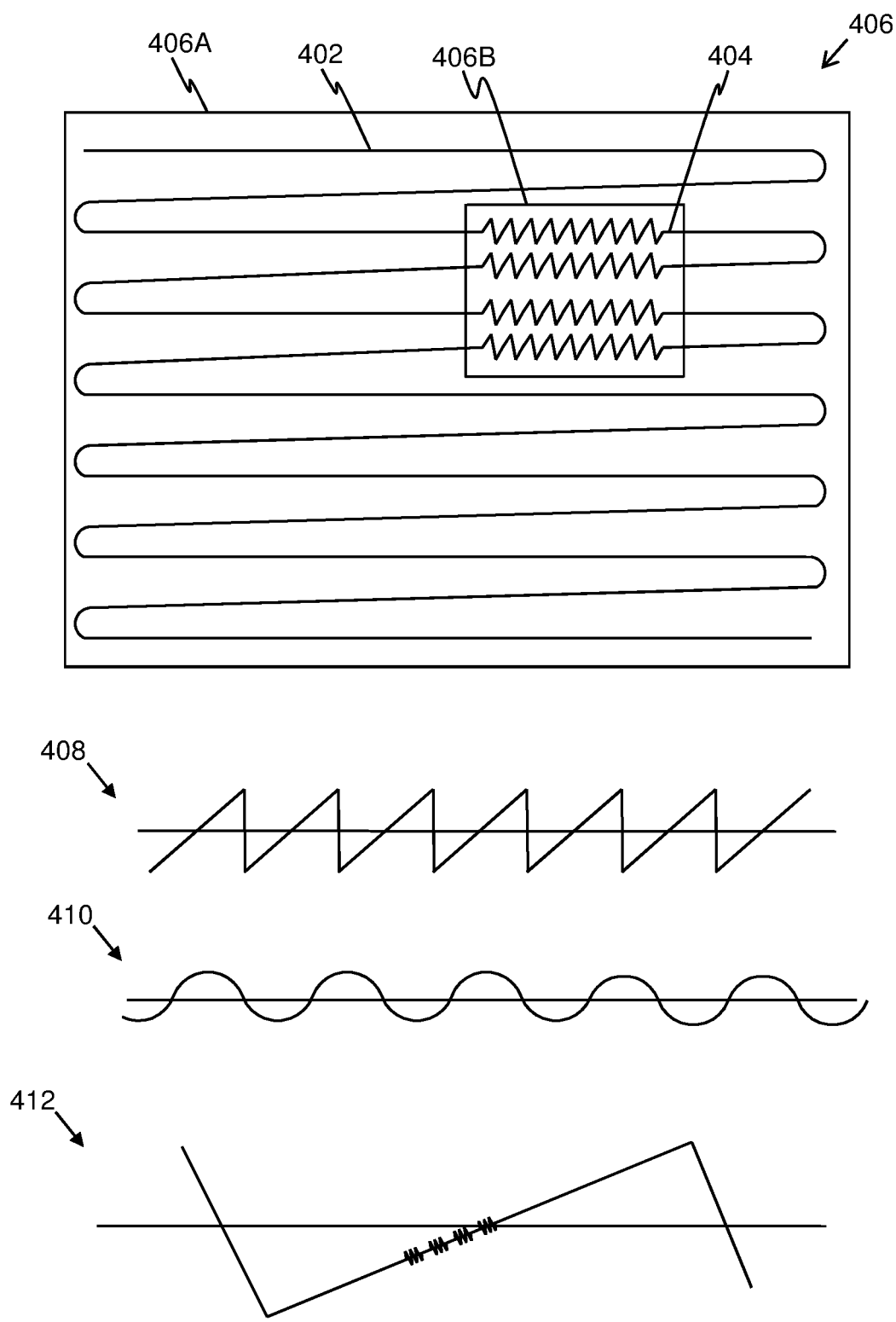
FIG. 4 illustrates a first scanning pattern and a second scanning pattern to be swept by at least one controllable scanning mirror for drawing a first region and a second region of an input image respectively, in accordance with an embodiment of the present disclosure.

Referring to FIG. 4, illustrated is a first scanning pattern 402 and a second scanning pattern 404 to be swept by at least one controllable scanning mirror (not shown) for drawing a first region 406A and a second region 406B of an input image 406 respectively, in accordance with an embodiment of the present disclosure. Notably, the first region 406A and the second region 406B are to be drawn over a projection surface (not shown). As shown, the first scanning pattern 402 to be swept by the at least one controllable scanning mirror for drawing the first region 406A is different from the second scanning pattern 404 to be swept by the at least one controllable scanning mirror for drawing the second region 406B, wherein the second scanning pattern 404 is to have at least one additional ripple function in a direction that is substantially perpendicular to a current scanning direction. For example, the first scanning pattern 402 is a raster scanning pattern and the second scanning pattern 404 is a raster scanning pattern with an additional ripple function in a direction that is substantially perpendicular to a raster scan direction. In such an example, to sweep the first scanning pattern 402, a tilt of the at least one scanning mirror may be controlled according to a saw-tooth function 408 in a Y direction and a sinusoidal function 410 in an X direction. Furthermore, to sweep the second scanning pattern 404, the tilt of the at least one scanning mirror may be controlled according to the sinusoidal function 410 in the X direction and a saw-tooth function 412 having the additional ripple function in the Y direction.

Figure 5:
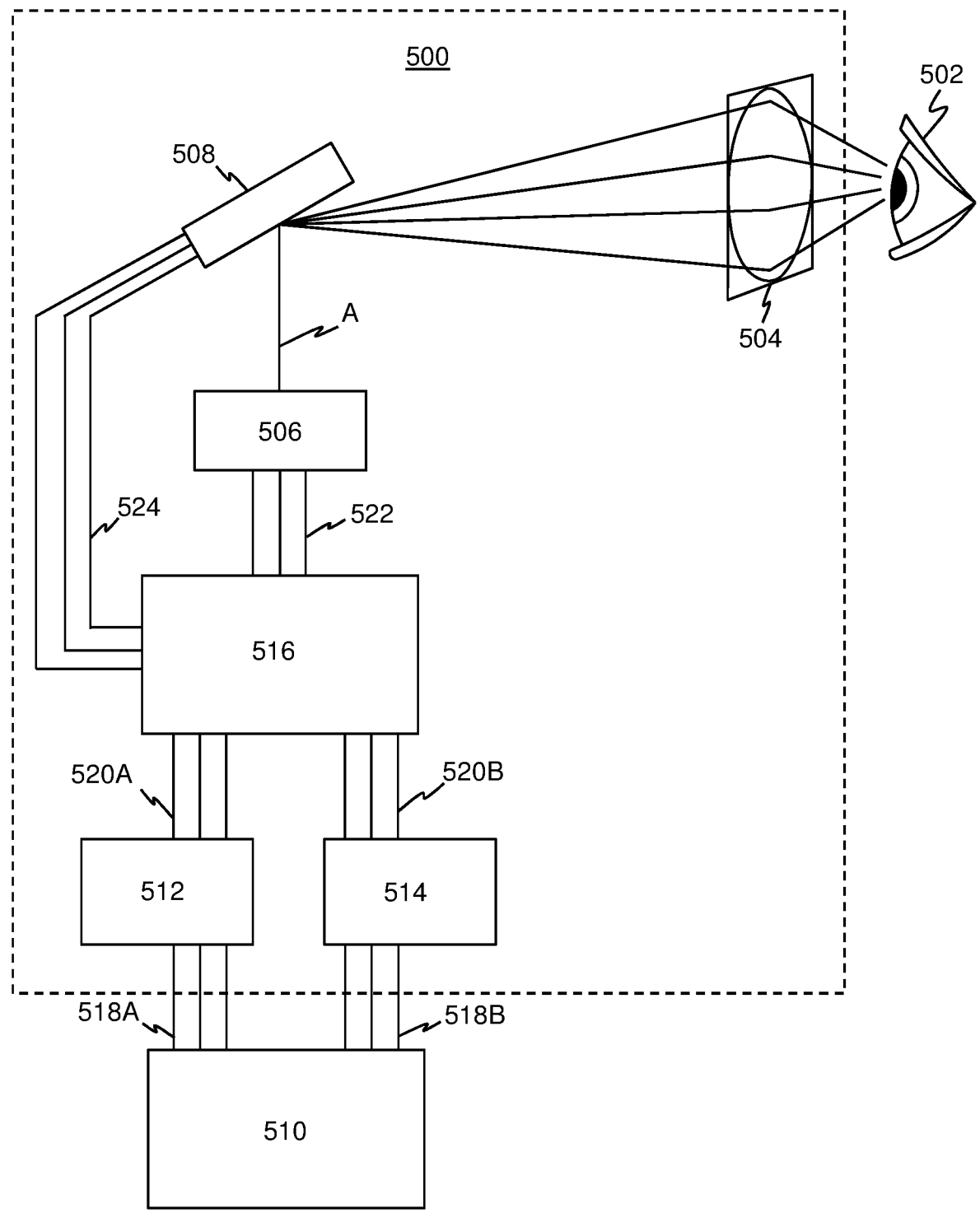
FIG. 5 is a schematic illustration of an exemplary logic circuitry associated with a display apparatus, in accordance with an embodiment of the present disclosure.

Referring to FIG. 5, illustrated is a schematic illustration of an exemplary logic circuitry associated with a display apparatus 500, in accordance with an embodiment of the present disclosure. The logic circuitry is employed for presenting constituent projections of a visual scene to a user's eye 502, via an exit optical element 504. The display apparatus 500 is shown to include a light source 506 and a controllable scanning mirror 508 associated with the eye 502. The light source 506 is operable to emit a substantially collimated and monochromatic light beam A. The controllable scanning mirror 508 is arranged to reflect the light beam A towards a projection surface (not shown) wherefrom the constituent projections of the visual scene are directed towards the eye 502. Notably, the scanning mirror 508 is to be controlled to change a direction in which the light beam A is reflected. The logic circuitry is shown to include a host device 510, a first frame buffer 512 for storing pixel data corresponding to a first region of an input image, a second frame buffer 514 for storing pixel data corresponding to a second region of the input image, and a logic selection circuit 516 for selecting pixel data stored in either or both of the first frame buffer 512 and the second frame buffer 514. The logic circuitry also includes a high bandwidth bus 518A between the host device 510 and the first frame buffer 512, a high bandwidth bus 518B between the host device 510 and the second frame buffer 514, a high bandwidth bus 520A between the first frame buffer 512 and the logic selection circuit 516, a high bandwidth bus 520B between the second frame buffer 514 and the logic selection circuit 516, a high bandwidth bus 522 between the logic selection circuit 516 and the light source 506, and a high bandwidth bus 524 between the logic selection circuit 516 and the controllable scanning mirror 508.

Figure 6A:
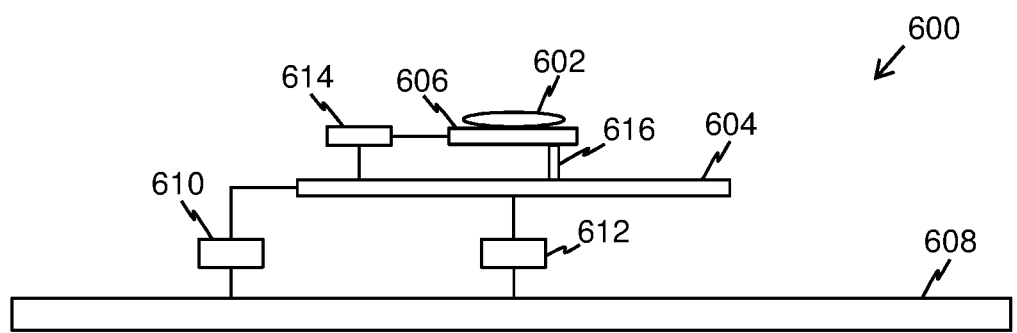
FIGS. 6A and 6B illustrate side views of an arrangement of a controllable scanning mirror with two bases, in accordance with different embodiments of the present disclosure.
Figure 6B:
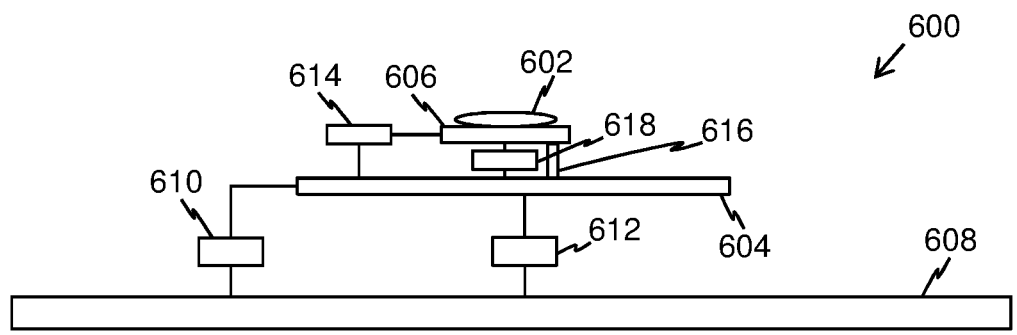

Referring to FIGS. 6A and 6B, illustrated are side views of an arrangement 600 of a controllable scanning mirror 602 with two bases, depicted as a first base 604 and a second base 606, in accordance with different embodiments of the present disclosure. It may be understood by a person skilled in the art that the FIGS. 6A and 6B include simplified arrangements of the controllable scanning mirror 602 with the two bases 604 and 606 for sake of clarity only, which should not unduly limit the scope of the claims herein. The person skilled in the art will recognize many variations, alternatives, and modifications of embodiments of the present disclosure.

In FIGS. 6A and 6B, the arrangement 600 depicts the controllable scanning mirror 602 and the two bases 604 and 606 as being mounted upon a foundation 608, which typically is a substrate of a chip mounted on a printed circuit board, in a stack-like manner. In other words, the foundation 608 provides support to the aforesaid arrangement 600. Notably, the first base 604 is coupled to the foundation 608 via at least a first actuator 610 and a second actuator 612. As shown, the second base 606 is stacked on top of the first base 604. Notably, at least a third actuator 614 is associated with the second base 606. As shown, the controllable scanning mirror 602 is substantially rigidly mounted onto the second base 606. The second base 606 is pivotably connected (namely, coupled) to the first base 604 via an element 616. For example the element 616 may be a bending rod-type construct.

In FIG. 6A, a raster scanning pattern is to be swept by the controllable scanning mirror 602 for drawing a first region and a second region over a projection surface. In such a case, the first actuator 610 is operable to control the tilt of the scanning mirror 602 according to a saw-tooth function in the Y direction, the second actuator 612 is operable to control the tilt of the scanning mirror 602 according to a sinusoidal function in the X direction, and the third actuator 614 is operable to control the tilt of the scanning mirror 602 according to the additional ripple function in the Y direction.

In FIG. 6B, a Lissajous scanning pattern is to be swept by the controllable scanning mirror 602 for drawing the first region and the second region over the projection surface. In such a case, the arrangement 600 also includes a fourth actuator 618 that is associated with the second base 606. In such a case, the first actuator 610 is operable to control the tilt of the scanning mirror 602 according to a sinusoidal function in the Y direction, the second actuator 612 is operable to control the tilt of the scanning mirror 602 according to a sinusoidal function in the X direction, the third actuator 614 is operable to control the tilt of the scanning mirror 602 according to the additional ripple function in the Y direction, and the fourth actuator 618 is operable to control the tilt of the scanning mirror 602 according to the additional ripple function in the X direction.

Figure 7:
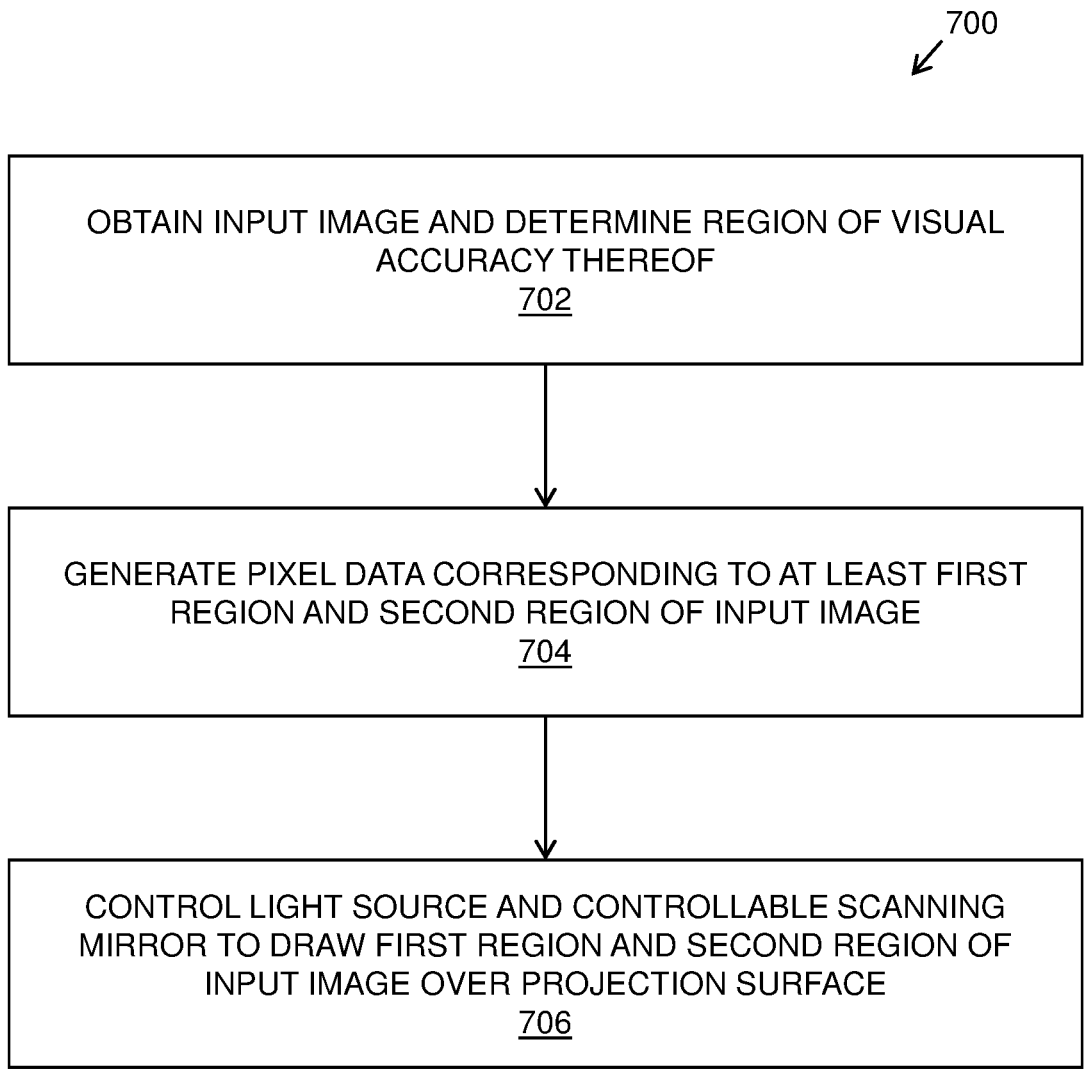
FIG. 7 illustrates steps of a method of displaying, via a display apparatus, in accordance with an embodiment of the present disclosure.

Referring to FIG. 7, illustrated are steps of a method 700 of displaying, via a display apparatus, in accordance with an embodiment of the present disclosure. At step 702, an input image is obtained, and a region of visual accuracy of the input image is determined, based upon the detected gaze direction of the user. At step 704, pixel data corresponding to at least a first region and a second region of the input image is generated. The second region substantially corresponds to the region of visual accuracy of the input image or a part of the region of visual accuracy, while the first region substantially corresponds to a remaining region of the input image or a part of the remaining region. Furthermore, the first region has a first resolution, while the second region has a second resolution, the second resolution being higher than the first resolution. At step 706, the at least one light source and the at least one controllable scanning mirror are controlled to draw the first region and the second region of the input image over a projection surface, wherein the step 706 of controlling comprises driving the at least one light source to emit a substantially collimated and monochromatic light beam and driving the at least one controllable scanning mirror to change a direction in which the light beam is reflected.

The steps 702 to 706 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
at least one light source per eye, the at least one light source being operable to emit a substantially collimated and monochromatic light beam;
at least one controllable scanning mirror per eye, the at least one controllable scanning mirror being arranged to reflect the light beam towards a projection surface, wherein the at least one scanning mirror is to be controlled to change a direction in which the light beam is reflected;
means for detecting a gaze direction of a user, wherein the gaze direction is to be detected when the display apparatus in operation is worn by the user; and
a processor coupled in communication with the at least one light source, the at least one controllable scanning mirror and the means for detecting the gaze direction, wherein the processor is configured to:
(a) obtain an input image and determine, based upon the detected gaze direction of the user, a region of visual accuracy of the input image;
(b) generate pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region is to have a first resolution, while the second region is to have a second resolution, the second resolution being higher than the first resolution; and
(c) control the at least one light source and the at least one controllable scanning mirror to draw the first region and the second region of the input image over the projection surface,
wherein a first scanning pattern to be swept by the at least one controllable scanning mirror for drawing the first region is different from a second scanning pattern to be swept by the at least one controllable scanning mirror for drawing the second region, wherein the second scanning pattern is to have at least one additional ripple function in a direction that is substantially perpendicular to a current scanning direction.

2. The display apparatus of claim 1, wherein the first scanning pattern is a raster scanning pattern, the second scanning pattern is a raster scanning pattern with an additional ripple function in a direction that is substantially perpendicular to a raster scan direction.

3. The display apparatus of claim 2, further comprising:
at least one base onto which the at least one controllable scanning mirror is mounted; and
at least a first actuator and a second actuator associated with the at least one base, wherein the first actuator is operable to control a tilt of the at least one scanning mirror according to a saw-tooth function in a Y direction, the second actuator is operable to control the tilt of the at least one scanning mirror according to a sinusoidal function in an X direction, further wherein the first actuator is operable to control the tilt of the at least one scanning mirror according to the additional ripple function in the Y direction.

4. The display apparatus of claim 2, further comprising:
at least two bases onto which the at least one controllable scanning mirror is mounted; and
at least a first actuator, a second actuator and a third actuator associated with the at least two bases, wherein the first actuator is operable to control a tilt of the at least one scanning mirror according to a saw-tooth function in a Y direction, the second actuator is operable to control the tilt of the at least one scanning mirror according to a sinusoidal function in an X direction, and the third actuator is operable to control the tilt of the at least one scanning mirror according to the additional ripple function in the Y direction.

5. The display apparatus of claim 1, wherein the first scanning pattern is a Lissajous scanning pattern, the second scanning pattern is a Lissajous scanning pattern with an additional ripple function in an X direction and an additional ripple function in a Y direction.

6. The display apparatus of claim 5, further comprising:
at least one base onto which the at least one controllable scanning mirror is mounted; and at least a first actuator and a second actuator associated with the at least one base, wherein the first actuator is operable to control a tilt of the at least one scanning mirror according to a sinusoidal function in the Y direction, the second actuator is operable to control the tilt of the at least one scanning mirror according to a sinusoidal function in the X direction, further wherein the first actuator is operable to control the tilt of the at least one scanning mirror according to the additional ripple function in the Y direction, and the second actuator is operable to control the tilt of the at least one scanning mirror according to the additional ripple function in the X direction.

7. The display apparatus of claim 5, further comprising:
at least two bases onto which the at least one controllable scanning mirror is mounted; and
at least a first actuator, a second actuator, a third actuator and a fourth actuator associated with the at least two bases, wherein the first actuator is operable to control a tilt of the at least one scanning mirror according to a sinusoidal function in the Y direction, the second actuator is operable to control the tilt of the at least one scanning mirror according to a sinusoidal function in the X direction, the third actuator is operable to control the tilt of the at least one scanning mirror according to the additional ripple function in the Y direction, and the fourth actuator is operable to control the tilt of the at least one scanning mirror according to the additional ripple function in the X direction.

8. The display apparatus of claim 1, wherein the first scanning pattern is to also have at least one additional ripple function in a direction that is substantially perpendicular to the current scanning direction, wherein an amplitude of the at least one additional ripple function of the first scanning pattern is smaller than an amplitude of the at least one additional ripple function of the second scanning pattern.

9. The display apparatus of claim 1, wherein the at least one light source is operable to employ a first power for drawing the first region, and to employ a second power for drawing the second region, the first power being greater than the second power.

10. The display apparatus of claim 1, wherein the at least one light source and the at least one controllable scanning mirror are operable to employ a first scanning speed for drawing the first region, and to employ a second scanning speed for drawing the second region, the first scanning speed being slower than the second spanning speed.

11. The display apparatus of claim 1, further comprising:
a light-sensing element, the light-sensing element being operable to sense an intensity of the light beam; and
means for stopping the light beam from reaching the user's eye,
wherein the processor is configured to detect when the intensity of the light beam exceeds a predefined threshold value, and to use said means to stop the light beam when the intensity of the light beam exceeds the predefined threshold value.

12. The display apparatus of claim 1, further comprising:
an accelerometer, the accelerometer being operable to sense a pattern in which the at least one controllable scanning mirror vibrates; and
means for stopping the light beam from reaching the user's eye,
wherein the processor is configured to detect when the sensed pattern is different from a predefined pattern that is recognized for the at least one controllable scanning mirror, and to use said means to stop the light beam when the sensed pattern is different from the predefined pattern.

13. A method of displaying, via a display apparatus comprising at least one light source per eye, at least one controllable scanning mirror per eye and means for detecting a gaze direction of a user, the method comprising:
(a) obtaining an input image and determining, based upon the detected gaze direction of the user, a region of visual accuracy of the input image;
(b) generating pixel data corresponding to at least a first region and a second region of the input image, wherein the second region substantially corresponds to the region of visual accuracy of the input image or a part of the region of visual accuracy, while the first region substantially corresponds to a remaining region of the input image or a part of the remaining region, wherein the first region has a first resolution, while the second region has a second resolution, the second resolution being higher than the first resolution; and
(c) controlling the at least one light source and the at least one controllable scanning mirror to draw the first region and the second region of the input image over a projection surface, wherein the step of controlling comprises driving the at least one light source to emit a substantially collimated and monochromatic light beam and driving the at least one controllable scanning mirror to change a direction in which the light beam is reflected,
wherein a first scanning pattern swept by the at least one controllable scanning mirror for drawing the first region is different from a second scanning pattern swept by the at least one controllable scanning mirror for drawing the second region, wherein the second scanning pattern has at least one additional ripple function in a direction that is substantially perpendicular to a current scanning direction.

14. The method of claim 13, wherein the first scanning pattern is a raster scanning pattern, the second scanning pattern is a raster scanning pattern with an additional ripple function in a direction that is substantially perpendicular to a raster scan direction.

15. The method of claim 13, wherein the first scanning pattern is a Lissajous scanning pattern, the second scanning pattern is a Lissajous scanning pattern with an additional ripple function in an X direction and an additional ripple function in a Y direction.

16. The method of claim 13, wherein the first scanning pattern also has at least one additional ripple function in a direction that is substantially perpendicular to the current scanning direction, wherein an amplitude of the at least one additional ripple function of the first scanning pattern is smaller than an amplitude of the at least one additional ripple function of the second scanning pattern.

17. The method of claim 13, further comprising employing a first power for drawing the first region; and employing a second power for drawing the second region, the first power being greater than the second power.

18. The method of claim 13, further comprising employing a first scanning speed for drawing the first region; and employing a second scanning speed for drawing the second region, the first scanning speed being slower than the second spanning speed.

19. The method of claim 13, wherein the display apparatus further comprises a light-sensing element and means for stopping the light beam from reaching the user's eye, the method comprising sensing, via the light-sensing element, an intensity of the light beam; detecting when the intensity of the light beam exceeds a predefined threshold value; and using said means to stop the light beam when the intensity of the light beam exceeds the predefined threshold value.

20. The method of claim 13, wherein the display apparatus further comprises an accelerometer and means for stopping the light beam from reaching the user's eye, the method comprising sensing, via the accelerometer, a pattern in which the at least one controllable scanning mirror vibrates; detecting when the sensed pattern is different from a predefined pattern that is recognized for the at least one controllable scanning mirror; and using said means to stop the light beam when the sensed pattern is different from the predefined pattern.

* * * * *